United States Patent
Bertiger et al.

(10) Patent No.: US 10,977,106 B2
(45) Date of Patent: Apr. 13, 2021

(54) TREE-BASED ANOMALY DETECTION (71) Applicant: Microsoft Technology Licensing, LLC, Redmond, WA (US)

(72) Inventors: Anna S. Bertiger, Seattle, WA (US); Alexander V. Moore, Seattle, WA (US); Adam E. Shirey, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 15/893,572

(22) Filed: Feb. 9, 2018

(65) Prior Publication Data
US 2019/0250975 A1 Aug. 15, 2019

(51) Int. Cl.
*G06F 11/00* (2006.01)
*G06F 11/07* (2006.01)
*G06F 16/901* (2019.01)

(52) U.S. Cl.
CPC ...... *G06F 11/0769* (2013.01); *G06F 11/0721* (2013.01); *G06F 16/9017* (2019.01)

(58) Field of Classification Search
CPC .......................... G06F 11/0769; G06F 11/0721
See application file for complete search history.

(56) References Cited

U.S. PATENT DOCUMENTS

| | | | | |
|---|---|---|---|---|
| 4,682,365 A | * | 7/1987 | Orita | G06K 9/6255 382/159 |
| 6,134,340 A | * | 10/2000 | Hsu | G06K 9/00087 382/124 |
| 6,415,279 B1 | * | 7/2002 | Gard | G06F 16/9014 711/3 |
| 2012/0054019 A1 | * | 3/2012 | Kitts | G06Q 30/0242 705/14.41 |
| 2014/0279775 A1 | * | 9/2014 | Chu | G06N 5/022 706/20 |
| 2015/0339572 A1 | * | 11/2015 | Achin | G06N 5/02 706/46 |

OTHER PUBLICATIONS

Dimitrie and Dan, Compare means of group with a mean of a subgroup, Jan. 23, 2015, Cross Validated, 2 pages (Year: 2015).*
Wu, et al., "Scorpion: Explaining Away Outliers in Aggregate Queries", In Proceedings of the VLDB Endowment, vol. 6, Issue 8, Jun. 1, 2013, pp. 553-564.
Han, et al., "Mining Frequent Patterns without Candidate Generation: A Frequent-Pattern Tree Approach", In Proceedings of Data Mining and Knowledge Discovery, vol. 8, No. 1, Jan. 1, 2004, pp. 53-87.

(Continued)

*Primary Examiner* — Katherine Lin (57) ABSTRACT

Examples for detecting anomalies in a dataset are provided herein. A decision tree is trained using the data set and partitions of the data set produced by the trained decision tree are identified. Further, subsets of data based at least on the partitions of the data set are identified and z-scores are computed for the subsets of data. Based at least on the subsets of data, a subset of data with a highest z-score is identified as an anomalous subset of data, and the anomalous subset of data is provided for display.

20 Claims, 7 Drawing Sheets

(56) References Cited

OTHER PUBLICATIONS

Leung, et al., "A Tree-Based Approach for Frequent Pattern Mining from Uncertain Data", In Proceedings of Pacific-Asia Conference on Knowledge Discovery and Data Mining, May 20, 2008, pp 653-661.

Roy, et al., "A Formal Approach to Finding Explanations for Database Queries", In Proceedings of the ACM SIGMOD International Conference on Management of Data, Jun. 18, 2014, pp. 1579-1590.

Roy, et al., "PerfAugur: Robust Diagnostics for Performance Anomalies in Cloud Services", In Proceedings of the IEEE 31st International Conference on Data Engineering, Apr. 13, 2015, 12 Pages.

Tang, et al., "Extracting Top-K Insights from Multi-Dimensional Data", In Proceedings of the ACM International Conference on Management of Data, May 9, 2017, 16 Pages.

Wasay, et al., "Queriosity: Automated Data Exploration", In Proceedings of the IEEE International Congress on Big Data, Jun. 27, 2015, 4 Pages.

Wu, et al., "Promotion Analysis in Multi-Dimensional Space", In Proceedings of the VLDB Endowment, vol. 2, Issue 1, Aug. 1, 2009, 12 Pages.

* cited by examiner

|  | Education level | Age | State of residence | Gender | Salary | * * * | Money spent on products |
|---|---|---|---|---|---|---|---|
| consumer 1 | college | 40 | Missouri | M | 150K | * * * | 5200 |
| consumer 2 | highschool | 31 | California | M | 2K | * * * | 600 |
| consumer 3 | attending college | 20 | Arkansas | F | 7k | * * * | 4000 |
| consumer 4 | attending college | 18 | North Carolina | M | 3K | * * * | 400 |
| consumer 5 | attending highschool | 17 | Kansas | F | 2K | * * * | 1500 |
| consumer 6 | highschool | 25 | Hawaii | F | 46K | * * * | 800 |
| consumer 7 | attending highschool | 15 | California | M | 3K | * * * | 700 |
| consumer 8 | attending highschool | 16 | New York | M | 5K | * * * | 400 |
| consumer 9 | attending highschool | 15 | Illinois | M | 2K | * * * | 800 |
| consumer 10 | attending college | 24 | New York | F | 25K | * * * | 600 |
| consumer 11 | college | 33 | Texas | F | 175K | * * * | 1800 |
| consumer 12 | attending highschool | 16 | Utah | M | 5K | * * * | 1000 |
| consumer 13 | attending highschool | 15 | Texas | M | 3K | * * * | 2200 |
| consumer 14 | highschool | 28 | Missouri | M | 60K | * * * | 900 |
| consumer 15 | attending highschool | 14 | Oregon | M | 2K | * * * | 500 |
| * | * | * | * | * | * | * * * | * |
| * | * | * | * | * | * | * * * | * |
| Consumer 50000 | college | 30 | Florida | F | 285K | * * * | 2800 |

| | Internal Storage Capacity | Location of Manufacture | Did the tablet Fail? | Date of Manufacture | Location of Purchase | * * * | Hours of use |
|---|---|---|---|---|---|---|---|
| tablet 1 | 16GB | Washington | Yes | 10/1/2016 | Miami, FL | * * * | 411 |
| tablet 2 | 32GB | California | No | 4/30/2016 | Dallas, TX | * * * | 117 |
| tablet 3 | 16GB | Washington | No | 3/26/2016 | New York, NY | * * * | 218 |
| tablet 4 | 64GB | Washington | No | 10/4/2016 | New York, NY | * * * | 955 |
| tablet 5 | 64GB | California | Yes | 8/23/2016 | Chicago, IL | * * * | 877 |
| tablet 6 | 16GB | California | Yes | 10/4/2016 | St. Louis, MO | * * * | 135 |
| tablet 7 | 32GB | California | No | 10/1/2016 | San Diego, CA | * * * | 345 |
| tablet 8 | 64GB | Washington | No | 8/23/2016 | Chicago, IL | * * * | 110 |
| tablet 9 | 64GB | Washington | No | 4/30/2016 | St. Louis, MO | * * * | 658 |
| tablet 10 | 16GB | California | No | 4/30/2016 | Lincoln, NE | * * * | 1400 |
| tablet 11 | 16GB | Washington | Yes | 8/23/2016 | Kansas City, MO | * * * | 422 |
| tablet 12 | 32GB | California | Yes | 10/1/2016 | Memphis, TN | * * * | 988 |
| tablet 13 | 64GB | California | No | 3/26/2016 | Denver, CO | * * * | 223 |
| tablet 14 | 16GB | Washington | Yes | 10/1/2016 | Springfield, MO | * * * | 556 |
| tablet 15 | 16GB | California | No | 10/4/2016 | Salt Lake City, UT | * * * | 789 |
| * | * | * | * | * | * | * * * | * |
| * | * | * | * | * | * | * * * | * |
| tablet 500000 | 16GB | Washington | No | 4/30/2016 | Houston, TX | * * * | 369 |

TREE-BASED ANOMALY DETECTION

BACKGROUND

Anomaly detection is an identification of items, events, or observations which do not conform to an expected pattern or other items in a dataset. Typically the anomalous items will translate to a problem, such as bank fraud, a structural defect, software faults, medical problems, or errors in a text. Humans are experts at pattern-matching and anomaly detection. Thus, most monitoring tools use dashboards to display graphs of ever-changing system and application performance metrics. The innate human ability to quickly detect patterns, combined with a developer or system administrator's learned domain experience, makes reviewing dashboards a very easy way to quickly identify anomalies in a set of data. However, as the amount of data increases as well as metrics to track the status of the data, complexity quickly exceeds human capacity for easy visual anomaly detection, and as such, automated processes have been developed to detect or identify anomalies in these more complex data sets.

However, conventional automated solutions for finding interesting or surprising items, events, or observations (e.g., anomalies) involve nearly exhaustive searches of possible subsets of data, or growing subsets of data from one dimensional slices to multi-dimensional slices resulting in inefficiencies with respect to processing time, which only increase as a size of a data set increases.

For example, some anomaly detection processes mine through logs of subsets of data with a largest difference from either a baseline or a dataset overall. However, these processes decrease in speed as a size of a data set increases. Other processes gather top insights from aggregates finding surprising subsets of data and scoring them, and ordering them from least to most surprising. However, this is done with considerable search as well as computing a measure on all possible m-tuples of n columns in a data set, and thus becomes inefficient when data sets includes a large number of rows and columns.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the disclosure involve a computerized method for detecting anomalies in data sets using a decision tree that is trained with the data set. The trained decision tree partitions the data set into a plurality of subsets of data. Z-scores are computed for the subsets of data to identify anomalous subsets of data, which are then provided for display.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

In general, anomalous cohort detection comprises sorting through some data to find subsets of the data that are different from a data set as a whole or from a baseline data set, in some fashion that may or may not be rigorously defined. This problem naturally divides into two parts, finding subsets of the data set that might be interesting or anomalous and finding a means of measuring and comparing relative interest of subsets of the data, with an additional objective to ensure that membership in an anomalous subset is human comprehensible. Aspects of the disclosure address these problems by identifying subsets of data in which a particular column, called a label, is most extreme or unexpected by training a decision tree and using the trained decision tree to select subsets of data in which the label is most extreme or unexpected. By using a machined learned approach to find subsets of a data set as described herein, speed is gained and is maintained even with very large data sets (e.g., data sets with hundreds of columns and hundreds of thousands of rows). For example, training a decision tree and then evaluating linear functions on disjoint subsets of data make a run time a sum of a time it takes to train a decision tree and linear time in a number of rows of a data set.

Thus, unlike conventional systems and methods used for detecting anomalies in a data set, the examples described herein enable an efficient detection of anomalous subsets of data from large data sets (e.g., data sets with hundreds of rows and columns). In contrast to conventions systems that parse through all of the data in the data set to identify anomalies, the examples provided herein use decisions trees to partition the data such that only a subset of a data set is processed for detection of anomalous subsets of data. Given that an average (e.g., a mean or median) and a standard deviation can be calculated from the data set, an absolute value of a z-score can be utilized to provide an indication of how anomalous a particular subset of data is compared to the data set, or other subsets of data (e.g., subsets of data from a baseline data set). In other examples, a non-absolute z-score or a difference in averages can also be used to provide an indication of how anomalous a particular subset of data is. This process not only improves the functioning of a computing device by reducing processing costs of the computing device, it enables the information provided to a user to be more manageable/comprehensible.

The examples described herein train a decision tree in order to partition a data set into explainable subsets on which a measure of interest behaves similarly. By taking this approach, three different types of problems can be addressed: (1) Anomalous cohort detection without a baseline: using a decision tree (e.g., a regression tree) to find subsets of data in which a key metric behaves differently than it does overall; (2) Anomalous cohort detection with a baseline: using a regression tree to examine subsets of data with a greatest change over a baseline data set; and (3) Anomaly (or failure) analysis: using a classification tree and given a label for anomalous data rows, finding subsets of the data which frequently contain this label.

Having briefly described an overview of different examples, an exemplary operating environment suitable for implementing the disclosed processes of detecting anomalies is described below. The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
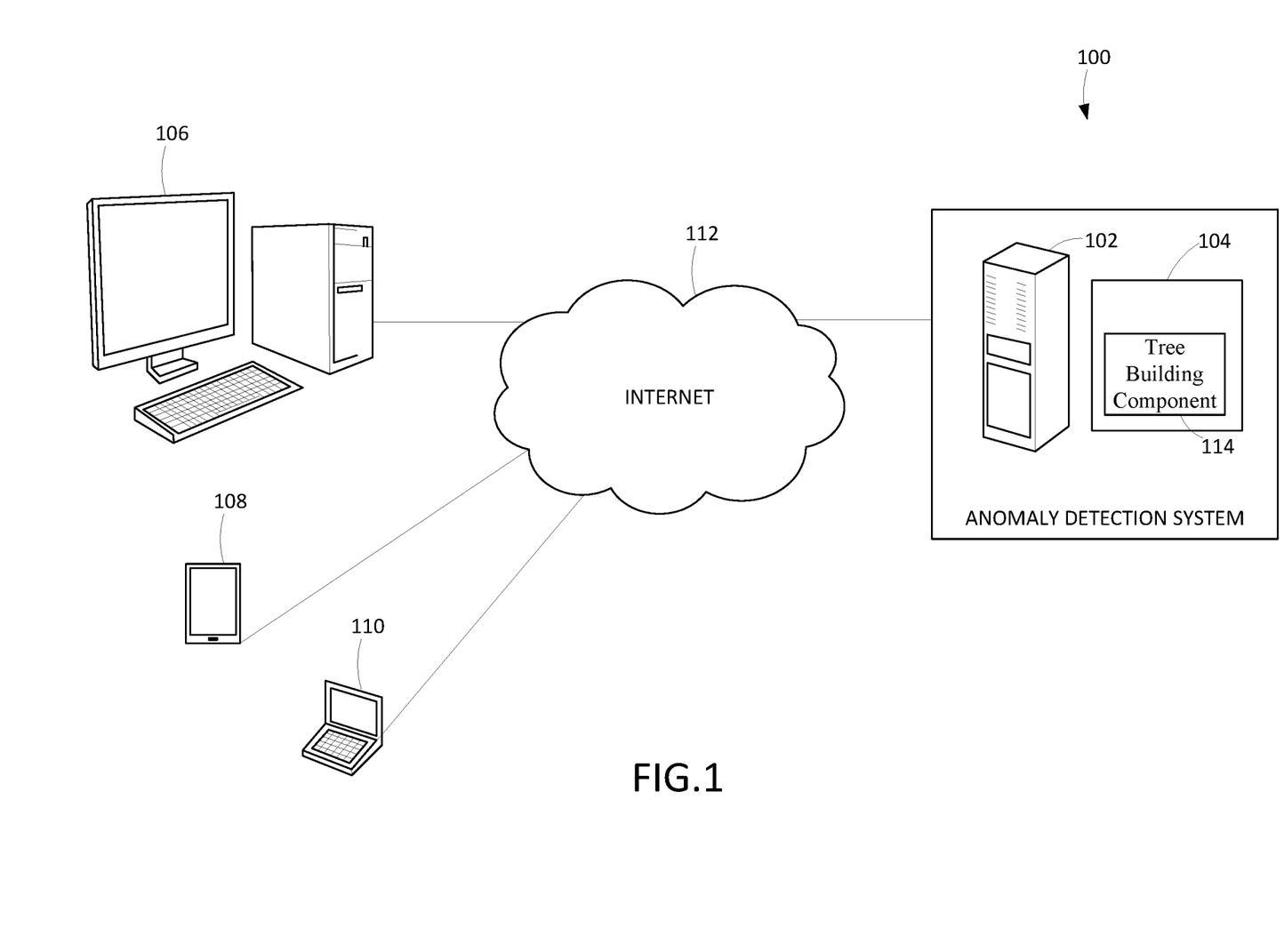
FIG. 1 is a block diagram of an operating environment for detecting anomalies in data sets.

FIG. 1 is a schematic block diagram of an anomaly detection system 100 deployed as a cloud service in this example. However, the anomaly detection system 100 can be deployed in non-cloud application, such as at local devices. The anomaly detection system 100 includes one or more computers 102 and memory 104 to store data sets from which anomalies are detected. The anomaly detection system 100 is connected to one or more end user computing devices, such as a desktop computer 106, a smart phone 108 and a laptop computer 110. For example, the anomaly detection system 100 is shown as connected to the end user computing devices via a computer network 112, illustrated as the Internet. The anomaly detection system 100 is configured to operate using tree building component 114 that builds a decision tree based at least in part on a data set stored in the memory 104.

Figure 2:
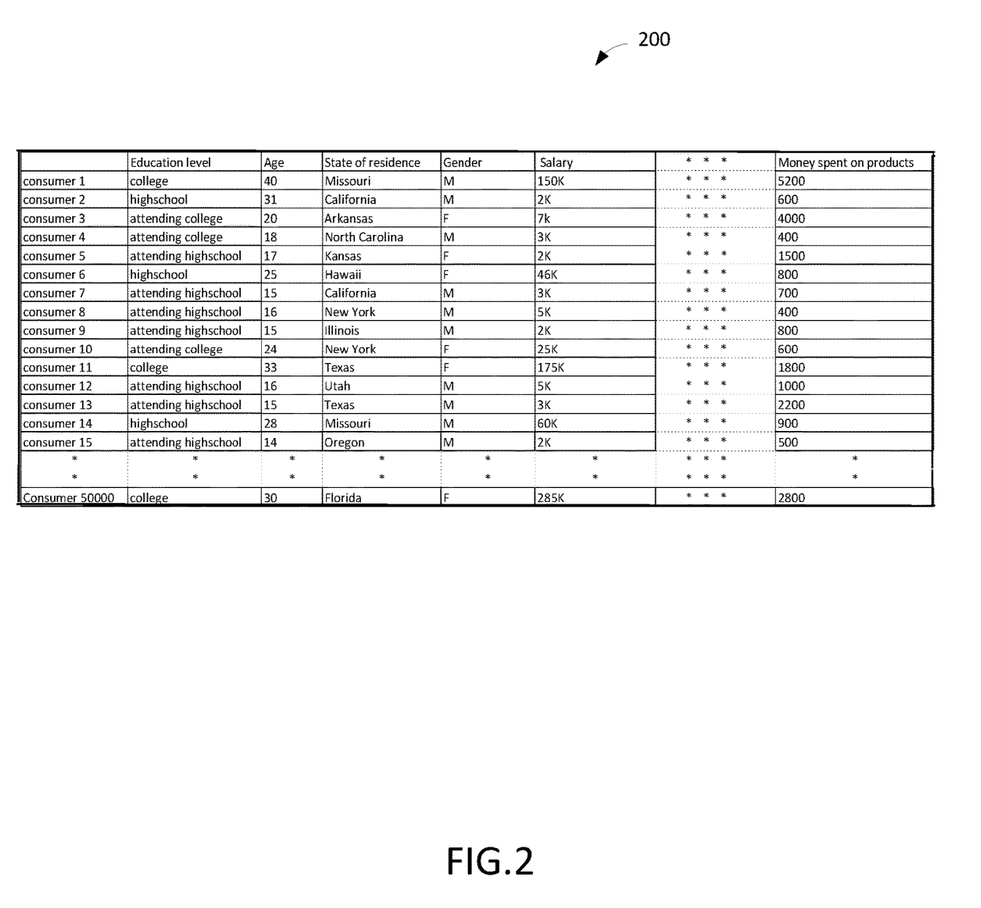
FIG. 2 is an exemplary data set for training a decision tree.

Turning now to FIG. 2, an exemplary data set 200 stored in the memory 104 of FIG. 1 is provided. While the data set 200 is a data set describing consumer demographics of a particular company, one of ordinary skill in the art will appreciate that the data shown in the data set 200 is for illustrative purposes. For example, a data set may comprise software metrics, wherein a decision tree can be used to find an anomalous subset of data that represents a software module with a greatest number of faults. In addition, a data set may comprise metrics of a widget, wherein a decision tree can be used to find an anomalous subset of data that represents a piece of the widget likely to fail within a defined period of time. Still further, a data set may comprise performance data of software, wherein a decision tree can be used to find an anomalous subset of data that identifies specific time periods the software performance is below and acceptable threshold.

Turning back to FIG. 2, the data set 200 is shown to include 50,000 rows of data (i.e., consumer 1 through consumer 50,000), and six or more columns of data. Each column in the data set 200 is identified by a feature that describes the column of data. For simplicity, not all of the rows and columns are listed. However, one of ordinary skill in the art will appreciate the any number of rows and columns may be used within a data set, as the examples provided herein provided the ability to process very large set of data very efficiently.

Turning back to FIG. 2, the features describing each of the columns shown in FIG. 2 are "Education Level," "Age," "State of residence," "Gender," "Salary," and "Money spent of products." Each row in the data set 200 provides information for a particular consumer with respect to each of the features/columns. Using a trained decision tree (e.g., a regression tree), methods described herein can efficiently find subsets of the data set 200 in which a particular numerical label is unusually high or low (e.g., anomalies) and provide a measure of how different each subset is from the whole data set 200 (e.g., anomalous cohort detection in single data set) or from a baseline data set (e.g., anomalous cohort detection with a baseline).

Anomalous Cohort Detection in a Single Data Set

For anomalous cohort detection in a single data set, subsets of a single data set in which the label tends to be most different (e.g. higher or lower) than an average of a label on the whole set of the data set are identified. The single data set is partitioned by training a decision tree on all of the data in the single data set. This trained decision tree provides a partition of the data into subsets of data and an average of a label of each of these subsets of data is compared to an average of the label on the whole data set using z-score.

For example, using the data set 200 as a single data set, a decision tree (e.g., regression tree 300 shown in FIG. 3) can be trained to predict how much money a particular group of consumers will spend. That is, a resulting subset of data identified by a terminal node comprises a plurality of predicates that describe a particular subset of consumers. In this example, the label of interest in the data set 200 is "Money spent on products," which will be shared across each of the resulting subsets of data.

Figure 3:
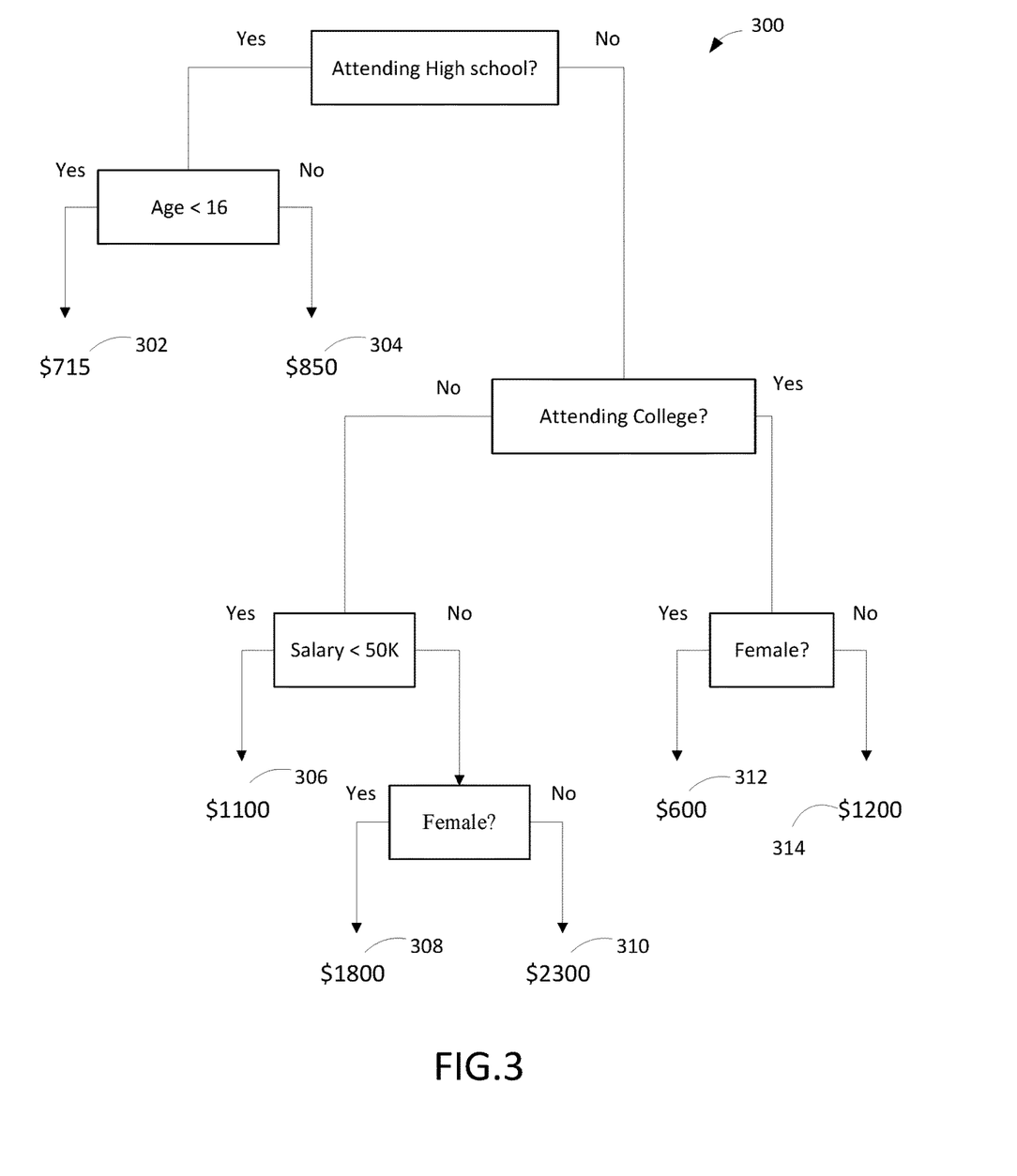
FIG. 3 is an exemplary decision tree based the data set in FIG. 2.

As explained above, an advantage of the examples described herein is an ability to process a large set of data efficiently. To this end, one factor in enabling, not only efficiency, but also comprehensibility, is limiting a depth of a decision tree, such as the regression tree 300. That is, one of the inputs when training the regression tree 300 is a maximum depth. By keeping the maximum depth of regression tree 300 at, for example, four layers, processing costs are reduced and the provided information is small enough to comprehend, but detailed enough to identify interesting or anomalous sets of data. By reducing the depth of a decision tree, a maximum quantity of predicates used to describe subsets of data produced by the decision tree is also limited. For example, the maximum number of predicates is equal to a maximum depth. Thus, by limiting a quantity of one also limits the quantity of the other. In the regression tree 300 shown in FIG. 3, the maximum quantity of predicates and/or the maximum depth of the regression tree 300 is set to four. As shown in FIG. 3, this results in a depth of the regression tree 300 to be no greater than four levels deep, as well as limiting the predicates for each subset to a maximum of four.

As shown in FIG. 3, the regression tree 300 includes seven terminal nodes (e.g., leaf nodes) that identify subsets of the data set 200. For example, terminal node 302 corresponds to a first subset of the data (e.g., consumer under the age of 16 that are still in high school) wherein "consumer under the age of 16" and "still in high school" are predicates provided by the regression tree 300 to describe the first subset. Further, terminal node 308 corresponds to a fourth subset of data (e.g., female consumer making over $50,000 per year who are not attending college or high school), wherein "female consumer", "making over $50,000 per year", "not attending college", and "not attending high school" are predicates provided by the regression tree 300 to describe the fourth subset. To determine anomalous subsets using the regression tree 300 (e.g., subsets of data that identify consumers who spend very little compared to the average or quite a bit more than the average), an absolute value of a z-score is computed for each terminal node. For illustrative purposed, a mean is used herein as the average. For example, assuming a mean of $1,500 and a standard deviation of $250, the absolute value of the z-score for each terminal node is as follows: 3.4 for terminal node 302, 2.6 for terminal node 304, 1.6 for terminal node 306, 1.2 for terminal node 308, 3.2 for terminal node 310, 3.6 for terminal node 312, and 1.2 for terminal node 314. Thus, given these calculated z-scores, consumers defined by the subset of data corresponding to terminal node 310 (e.g., males making over $50,000 per year who are not attending college or high school) spend the most money (a little over three times the standard deviation), while consumers defined by the subset of data corresponding to terminal node 312 (e.g., females who are attending college) spend the least amount of money (a little over three and halftimes the standard deviation).

Anomalous Cohort Detection with a Baseline

For anomalous cohort detection with a baseline, two data sets (e.g. data sets from different time periods, treatment and control groups from an experiment) are used for comparisons to detect anomalies (in this example, an anomalous subset of data is a subset from each data set that illustrates the greatest change between the data sets). For example, assume the data set 200 from FIG. 2 is the data set (e.g., the detection data set) in which anomalies are being searched when compared to a baseline data set (e.g., a data set that includes a similar set of data from a different period of time, for example, a previous year). In this example, since the detection data (e.g., the data set 200) and baseline data set have a same structure, a decision tree (e.g., the regression tree 300) produced using the data set 200 can be used to also partition the baseline data set (i.e., using splits given by the decision tree trained on the data set 200) resulting in regression tree 400 shown in FIG. 4, further reducing processing resource usage on a computing system. In this example, the anomalous subsets of data are not determined based on metrics within the single data set (e.g., data set 200), rather, the anomalous subsets are identified based on comparing z-scores between subsets of data in the data set 200 to corresponding subsets of data in the baseline data set. This provides the ability to determine anomalies that may only be revealed over using data from different periods of time.

Figure 4:
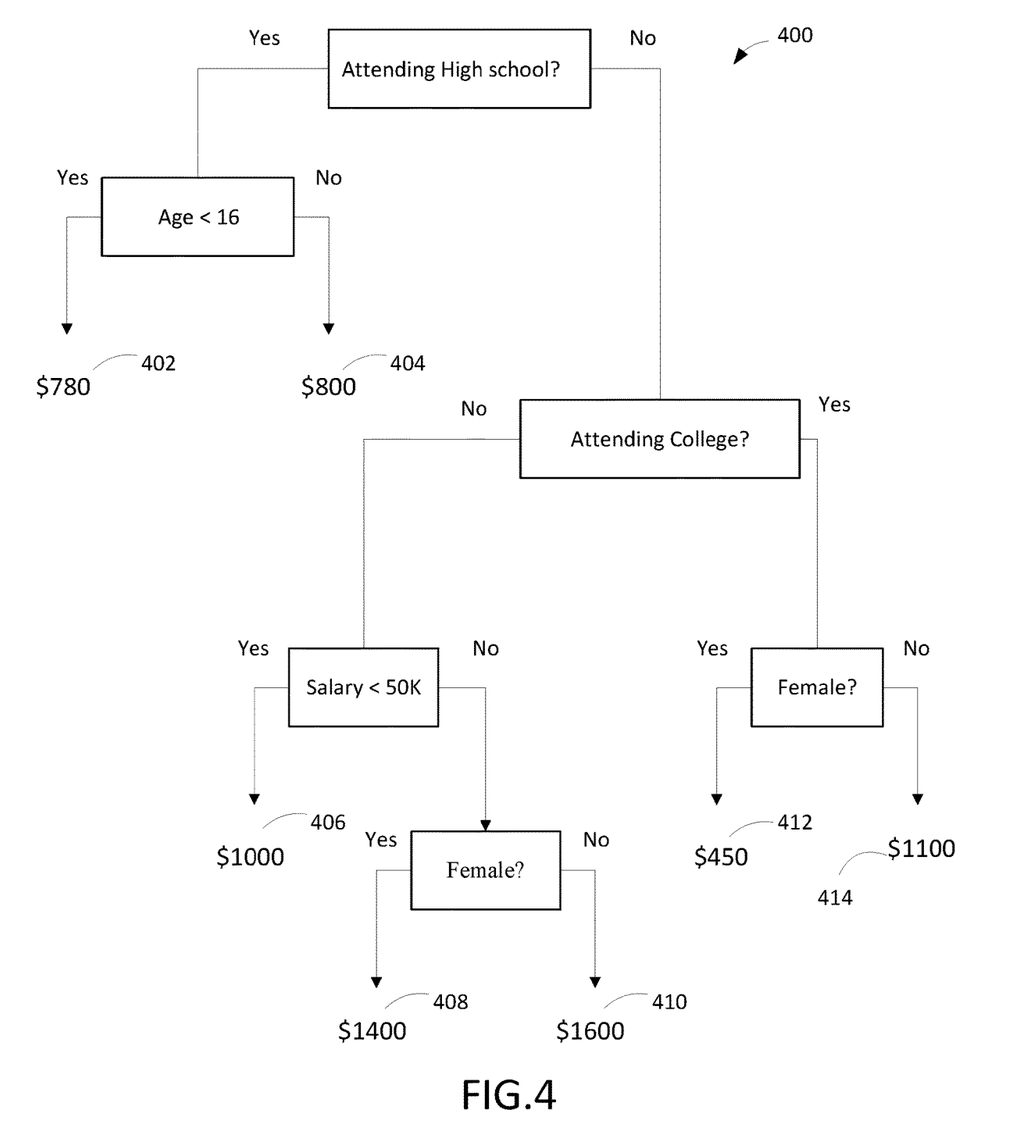
FIG. 4 is an exemplary decision tree from a baseline data set.

For simplicity, assume a mean of $1,500 and a standard deviation of $250 (the same as the data set 200) for the baseline data set, the absolute value of z-scores for each terminal node in the regression tree 400 is as follows: 2.88 for terminal node 402, 2.8 for terminal node 404, 2.0 for terminal node 406, 0.4 for terminal node 408, 0.4 for terminal node 410, 4.2 for terminal node 412, and 1.6 for terminal node 414. By comparing the z-scores of terminal nodes 302-312 to the z-scores of terminal nodes 402-412, the terminal nodes 310 and 410 experienced the greatest difference in change, resulting in a difference of 2.8 between the two z-scores, illustrating that males making over 50,000 per year who do not currently attend college or high school have spent significantly more from the period of time represented by the baseline data set to the period of time represented by the data set 200.

Anomalous Analysis

For anomalous analysis, a classification tree is used to identify anomalous subsets of data. Classification trees, as the name implies, are used to separate a dataset into classes belonging to a response variable. Thus, classification trees are used when a response or target variable is categorical in nature, in contrast to a regression tree, which is used when a response or target variable is numerical in nature.

Figure 5:
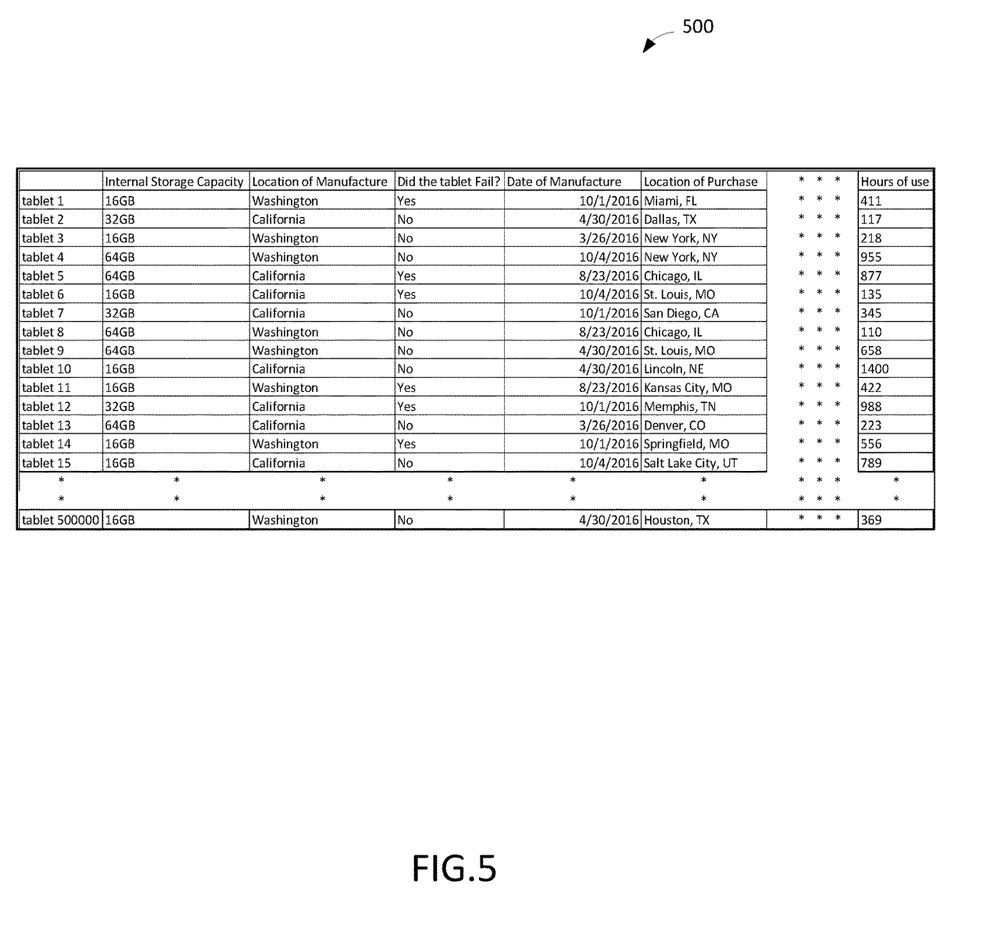
FIG. 5 is an exemplary data set for training a decision tree.

For example, turning to FIG. 5, a data set 500 providing information gathered for a plurality of tablets is shown. Data set 500 comprises a list of tablets 1-500,000 in the rows of data set 500, while each column of data set 500 is defined by a feature that describes a particular aspect of each tablet. For example, the columns provided in data set 500 are as follows: "Internal Storage Capacity," "Location of Manufacture," "Did the Tablet Fail?," "Date of Manufacture," "Location of Purchase," and "Hours of Use." In this example, a classification tree is used to identify sub-sets of tablets that are often returned in order to further investigate root causes of failure. That is, a resulting subset of data identified by a terminal node comprises a plurality of predicates that describe a particular subset of tablets that have failed. In this example, the label of interest in the data set 500 is "Did the Tablet Fail?," which will be shared across each of the resulting subsets of data. In another example, the column indicating "Did the Tablet Fail?" may indicate whether a part has failed within a certain period of time, for example, "Did the Tablet Within the First Year?" This is the label the operations predict on, and the operations continue as in the other examples provided herein. Further, some rows of data are pre-marked as anomalous (e.g., tablets which have failed), while leaving others marked as normal (e.g. tablets that did not fail). The classification tree is built with the label "Did the Tablet Fail?" and the rows identified as anomalous, using the anomalous cohort detection in a single data set described above. Z-scores are computed for the subsets of data identified by each leaf node in comparison to the entire data set 500, and the computed z-scores are used to identify subsets of the data in a variety of ways, for example, by identifying subsets of the data in a certain percentile (e.g. the $99^{th}$ percentile or the $1^{st}$ percentile) or ordering the subsets of data defined by the leaf nodes from, for example least anomalous to most anomalous, and returning identified subsets of the data and/or the ordered subsets of data for display to a user.

Figure 6:
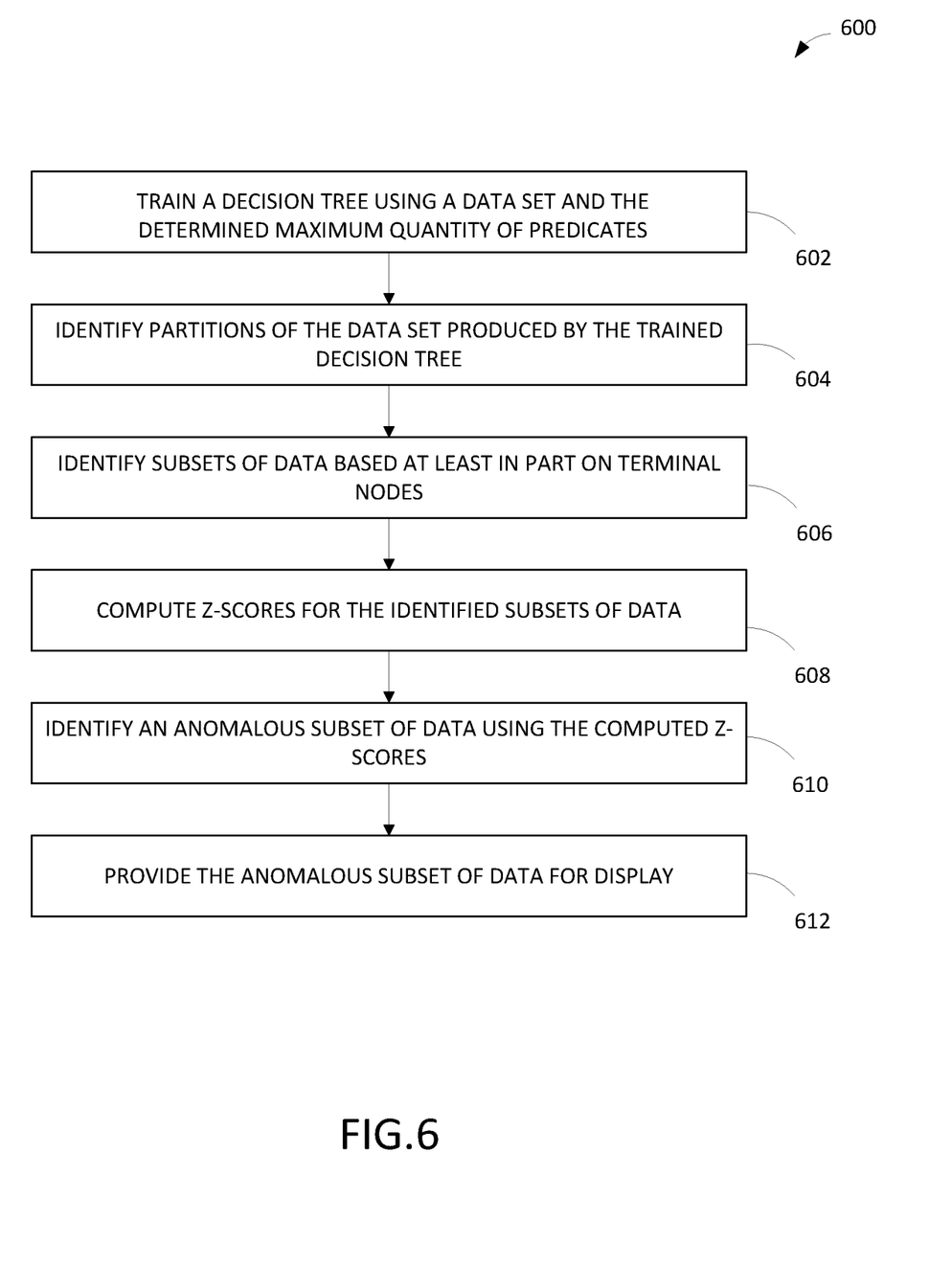
FIG. 6 is an exemplary flow chart illustrating detection of anomalies in a data set.

Turning now to FIG. 6, an exemplary flow chart of a method 600 for detecting anomalies in a data set is provided. In particular, this figure is an exemplary flow chart illustrating operations of a computing device to detect anomalies in single sets of data as well as anomalies in comparison to a baseline set of data. The operations illustrated in the flow charts described herein may be performed in a different order than is shown, may include additional or fewer steps, and may be modified as desired or needed. Additionally, one or more operations may be performed simultaneously, concurrently or sequentially.

In particular, at 602, the computing device trains a decision tree (e.g., the regression tree 300) using a data set (e.g., the data set 200). As explained above, a maximum quantity of predicates used to describe subsets of data produced by a decision tree may be defined by a user and/or stored in a memory (e.g., the memory 104). By limiting the quantity of predicates used to describe a subset of data, not only is speed gained (as this also limits the depth of the decision tree and thus limits the amount of information needed to be processed to produce the decision tree), but enough information (e.g., number of predicates) is still provided to make the subsets of data comprehensible to a user.

At 604, partitions of the data set 200 produced by the decision tree are identified. For example, as shown in FIG.

3, the regression tree 300 is partitioned based on terminal nodes 302-314, and using terminal nodes 302-314, subsets of data are identified at 606. At 608, z-scores for the subsets of data are computed. For example, when the method 500 is applied to a single set of data (e.g., the data set 200), an average of a label of each of the subsets produced by the decision tree is compared to an average of the label on the whole data set 200 using z-score. At 610, a subset of data with a highest z-score is identified as an anomalous subset of data. In another example, when the method 600 is applied to a comparison between the data set 200 and a baseline data set, a comparison is made between the average of the labels on the subsets from each data set to find the most significant changes using a z-score. In this example, the respective subsets of data from the data set 200 and the baseline data set with a greatest difference in z-scores are identified as anomalous subsets of data. At 612, the anomalous subset of data is provided for display. For example, a user may be provided with a list of all of the subsets of data (defined using the predicates associated with the subsets) in an order from least anomalous to most anomalous. In another example, a user may be provided with only the most (or least) anomalous subsets of data based on the provided order or based on a certain percentile the subsets of data fall into (e.g., the $99^{th}$ percentile or the $1^{st}$ percentile). By presenting the anomalous subsets of data in this way, a user can comprehend the anomalous data and utilize this information to his/or advantage, depending on the type of data being analyzed.

Exemplary Operating Environment

Figure 7:
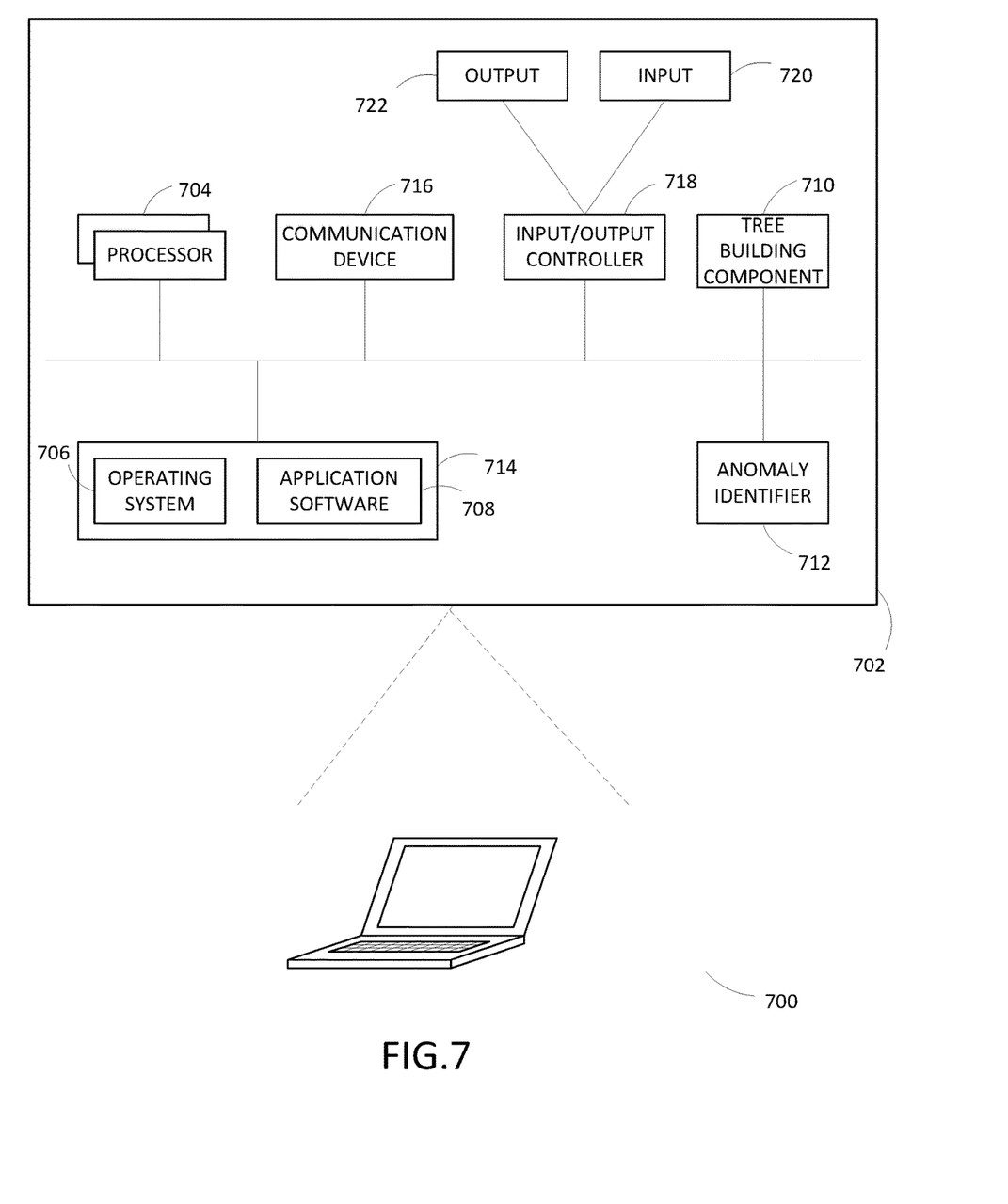
FIG. 7 illustrates a computing apparatus as a functional block diagram.

The present disclosure is operable with a computing apparatus 702 according to an embodiment as a functional block diagram 700 in FIG. 7. In one example, components of the computing apparatus 702 may be implemented as a part of an electronic device according to one or more embodiments described in this specification. The computing apparatus 702 comprises one or more processors 704 which may be microprocessors, controllers or any other suitable type of processors for processing computer executable instructions to control the operation of the electronic device. Platform software comprising an operating system 706 or any other suitable platform software may be provided on the apparatus 702 to enable application software 708 to be executed on the device. According to an embodiment, generating a decision tree using a tree building component 712 and identifying anomalies using an anomaly identifier 714 may be accomplished by software.

Computer executable instructions may be provided using any computer-readable media that are accessible by the computing apparatus 702. Computer-readable media may include, for example, computer storage media such as a memory 714 and communications media. Computer storage media, such as the memory 714, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 714) is shown within the computing apparatus 702, it will be appreciated by a person skilled in the art, that the storage may be distributed or located remotely and accessed via a network or other communication link (e.g. using a communication device 716).

The computing apparatus 702 may comprise an input/output controller 718 configured to output information to one or more input devices 720 and output devices 722, for example a display or a speaker, which may be separate from or integral to the electronic device. The input/output controller 718 may also be configured to receive and process an input from the one or more input devices 720, for example, a keyboard, a microphone or a touchpad. In one embodiment, the output device 722 may also act as the input device 720. An example of such a device may be a touch sensitive display. The input/output controller 718 may also output data to devices other than the output device 722, e.g. a locally connected printing device. In some embodiments, a user may provide input to the input device(s) 720 and/or receive output from the output device(s) 722.

In some examples, the computing apparatus 702 detects voice input, user gestures or other user actions and provides a natural user interface (NUI). This user input may be used to author electronic ink, view content, select ink controls, play videos with electronic ink overlays and for other purposes. The input/output controller 718 outputs data to devices other than a display device in some examples, e.g. a locally connected printing device.

NUI technology enables a user to interact with the computing apparatus 702 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 702 is configured by the program code when executed by the processor(s) 704 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Alternatively, or in addition to the other examples described herein, examples include any combination of the following:

A computerized method for detecting anomalies in a data set, the method comprising:
training, by a processor, a decision tree using the data set;
identifying partitions of the data set produced by the trained decision tree;
identifying subsets of data based at least on the partitions of the data set;
computing z-scores for the subsets of data;
based at least on the subsets of data, identifying a subset of data with a highest z-score as an anomalous subset of data; and
providing the anomalous subset of data for display.

The computerized method described above, further comprising:
determining a maximum quantity of predicates to describe the subsets of data; and
defining a maximum depth for the decision tree to equal the maximum quantity of predicates.

The computerized method described above, wherein each of the subsets of data correspond to a particular terminal node of a plurality of terminal nodes generated by the trained decision tree.

The computerized method described above, wherein the data set comprises a plurality of columns of data and a plurality of rows of data, and wherein each of the plurality of terminal nodes indicate which rows of the plurality of rows are in a particular subset of data.

The computerized method described above, wherein the data set comprises software metrics, and wherein providing the anomalous subsets of data for display comprises providing the anomalous subset of data that represent a software module with a greatest number of faults for diagnosing errors in a computing system.

The computerized method described above, wherein the decision tree is a regression tree.

The computerized method described above, wherein identifying a subset of data with a highest z-score comprises ordering the subsets of data from lowest z-score to highest z-score.

The computerized method described above, wherein computing z-scores for the subsets of data comprises computing a z-score for a difference in averages between the subsets of data and all of the data set.

A system for detecting anomalies in a data set, the system comprising:
one or more processors;
a memory storing the data set and a decision tree component;
wherein the one or more processors are programmed to:
execute the decision tree component to train a decision tree using the data set;
identify partitions of the data set produced by the trained decision tree;
identify subsets of data based at least on the partitions of the data set;
compute z-scores for the subsets of data;
based at least on the subsets of data, identify a subset of data with a highest z-score as an anomalous subset of data; and
provide the anomalous subset of data for display.

The system described above, wherein the one or more processors are further programmed to:
determine a maximum quantity of predicates to describe the subsets of data; and
define a maximum depth for the decision tree to equal the maximum quantity of predicates.

The system described above, wherein each of the subsets of data correspond to a particular terminal node of a plurality of terminal nodes generated by the trained decision tree.

The system described above, wherein the data set comprises a plurality of columns of data and a plurality of rows of data, and wherein each of the plurality of terminal nodes indicate which rows of the plurality of rows are in a particular subset of data.

The system described above, wherein the data set comprises software metrics, and wherein the anomalous subset of data represents a software module with a greatest number of faults.

The system described above, wherein computing z-scores for the subsets of data comprises computing a z-score for a difference in averages between the subsets of data and all of the data set.

The system described above, wherein the memory further stores a baseline data set comprising data from a first period of time, the data set comprising data from a second period of time, and wherein the one or more processors are further programmed to:
access the baseline data set, and wherein computing z-scores for the subsets of data comprises computing a z-score for a difference in averages between the subsets of data from the data set and corresponding subsets of data from the baseline data set.

One or more computer-readable storage media comprising computer-executable instructions for detecting anomalies in a data set, the computer-executable instructions when executed by one or more processors, cause the one or more processors to perform operations comprising:
training a decision tree using the data set;
identifying partitions of the data set produced by the trained decision tree;
identifying subsets of data based at least on the partitions of the data set;
computing z-scores for the subsets of data;
based at least on the subsets of data, identifying a subset of data with a highest z-score as an anomalous subset of data; and
providing the anomalous subset of data for display.

The one more computer-readable storage media described above, wherein the computer-executable instructions further cause the one or more processors to perform operations comprising:
determining a maximum quantity of predicates to describe the subsets of data; and
defining a maximum depth for the decision tree to equal the maximum quantity of predicates.

The one more computer-readable storage media described above, wherein each of the subsets of data correspond to a particular terminal node of a plurality of terminal nodes generated by the trained decision tree, and wherein the data set comprises a plurality of columns of data and a plurality of rows of data, and wherein each of the plurality of terminal nodes indicate which rows of the plurality of rows are in a particular subset of data.

The one more computer-readable storage media described above, wherein computing z-scores for the subsets of data comprises computing a z-score for a difference in averages between the subsets of data and all of the data set.

The one more computer-readable storage media described above, wherein the computer-executable instructions further cause the one or more processors to perform operations comprising:

accessing a baseline data set, the baseline data comprising data from a first period of time, the data set comprising data from a second period of time, and wherein computing z-scores for the subsets of data comprises computing a z-score for a difference in averages between the subsets of data from the data set and corresponding subsets of data from the baseline data set.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for detecting anomalies in a data set. The illustrated one or more processors 604 together with the computer program code stored in memory 614 constitute exemplary processing means for training a decision tree using the data set, identifying partitions of the data set produced by the trained decision tree, identifying subsets of data based at least on the partitions of the data set, computing z-scores for the subsets of data, based at least on the subsets of data, identifying a subset of data with a highest z-score as an anomalous subset of data, and providing the anomalous subset of data for display.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for detecting anomalies in a data set, the method comprising:

training, by a processor, a regression tree using the data set;
identifying, by the processor, partitions of the data set produced by the trained regression tree;
identifying, by the processor, subsets of data based at least on the partitions of the data set;
accessing, by the processor, a baseline data set comprising data from a first period of time, the data set comprising data from a second period of time;
computing, by the processor, z-scores for a difference in averages between the subsets of data from the data set and the corresponding subsets of data from the baseline data set;
based at least on computing, identifying, by the processor, a subset of data with a highest z-score as an anomalous subset of data; and
providing, by the processor, the anomalous subset of data for display.

2. The method of claim 1, wherein the data set comprises software metrics, and wherein providing the anomalous subsets of data for display comprises providing the anomalous subset of data that represent a software module with a greatest number of faults for diagnosing errors in a computing system.

3. The method of claim 1, wherein each of the subsets of data correspond to a particular terminal node of a plurality of terminal nodes generated by the trained regression tree.

4. The method of claim 3, wherein the data set comprises a plurality of columns of data and a plurality of rows of data, and wherein each of the plurality of terminal nodes indicate which rows of the plurality of rows are in a particular subset of data.

5. The method of claim 1, further comprising:
determining a maximum quantity of predicates to describe the subsets of data, wherein the maximum quantity of predicates define the subset of data; and
defining a maximum depth for the regression tree to equal the maximum quantity of predicates.

6. The method of claim 1, wherein identifying a subset of data with a highest z-score comprises ordering the subsets of data from lowest z-score to highest z-score.

7. The method of claim 1, wherein providing the anomalous subset of data for display comprises providing the anomalous subset of data in an order from least anomalous to most anomalous.

8. A system for detecting anomalies in a data set, the system comprising:
one or more processors;
a memory storing, the data set, a decision tree component, and a baseline data set comprising data from a first period of time, the data set comprising data from a second period of time;
wherein the one or more processors are programmed to:
execute the decision tree component to train a regression tree using the data set;
identify partitions of the data set produced by the trained regression tree;
identify subsets of data based at least on the partitions of the data set;
accessing the baseline data set;
compute z-scores for a difference in averages between the subsets of data from the data set and the corresponding subsets of data from the baseline data set,
based at least on the computing, identify a subset of data with a highest z-score as an anomalous subset of data; and
provide the anomalous subset of data for display.

9. The system of claim 8, wherein the one or more processors are further programmed to:
determine a maximum quantity of predicates to describe the subsets of data; and
define a maximum depth for the regression tree to equal the maximum quantity of predicates.

10. The system of claim 8, wherein each of the subsets of data correspond to a particular terminal node of a plurality of terminal nodes generated by the trained regression tree.

11. The system of claim 10, wherein the data set comprises a plurality of columns of data and a plurality of rows of data, and wherein each of the plurality of terminal nodes indicate which rows of the plurality of rows are in a particular subset of data.

12. The system of claim 8, wherein the data set comprises software metrics, and wherein the anomalous subset of data represents a software module with a greatest number of faults.

13. The system of claim 8, wherein providing the anomalous subset of data for display comprises providing the anomalous subset of data in an order from least anomalous to most anomalous.

14. The system of claim 8, wherein identifying a subset of data with a highest z-score comprises ordering the subsets of data from lowest z-score to highest z-score.

15. One or more computer storage medium comprising computer-executable instructions for detecting anomalies in a data set, the computer-executable instructions when executed by one or more processors, cause the one or more processors to perform operations comprising:
training a regression tree using the data set;
identifying partitions of the data set produced by the trained regression tree;
identifying subsets of data based at least on the partitions of the data set;
accessing baseline data set, the baseline data set comprising data from a first period of time, the data set comprising data from a second period of time;
computing z-scores for a difference in averages between the subsets of data from the data set and the corresponding subsets of data from the baseline data set;
based at least on the subsets of data, identifying a subset of data with a highest z-score as an anomalous subset of data; and
providing the anomalous subset of data for display.

16. The one or more computer storage medium of claim 15, wherein the computer-executable instructions further cause the one or more processors to perform operations comprising:
determining a maximum quantity of predicates to describe the subsets of data; and
defining a maximum depth for the decision tree to equal the maximum quantity of predicates.

17. The one or more computer storage medium of claim 15, wherein each of the subsets of data correspond to a particular terminal node of a plurality of terminal nodes generated by the trained regression tree.

18. The one or more computer storage medium of claim 17, wherein the data set comprises a plurality of columns of data and a plurality of rows of data, and wherein each of the plurality of terminal nodes indicate which rows of the plurality of rows are in a particular subset of data.

19. The one or more computer storage medium of claim 15, wherein identifying a subset of data with a highest z-score comprises ordering the subsets of data from lowest z-score to highest z-score.

20. The one or more computer storage medium of claim 15, wherein providing the anomalous subset of data for display comprises providing the anomalous subset of data in an order from least anomalous to most anomalous.

\* \* \* \* \*